United States Patent
Lim et al.

(10) Patent No.: US 11,536,670 B2
(45) Date of Patent: *Dec. 27, 2022

(54) SYSTEM AND METHOD FOR ENGINE INSPECTION

(71) Applicant: General Electric Company, Schenectady, NY (US)

(72) Inventors: Ser Nam Lim, Niskayuna, NY (US); Joseph Vincent Pawlowski, Laguna Hills, CA (US); Li Guan, Bellevue, WA (US); Yogesh Agarwal, Bangalore (IN); Binod Pandey, Bangalore (IN); Srivatsa Dhanvantri, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/345,133

(22) Filed: Jun. 11, 2021

(65) Prior Publication Data

US 2021/0302327 A1    Sep. 30, 2021

Related U.S. Application Data

(63) Continuation of application No. 14/577,255, filed on Dec. 19, 2014, now Pat. No. 11,060,979.

(51) Int. Cl.
*H04N 13/02* (2006.01)
*G01N 21/88* (2006.01)
(Continued)

(52) U.S. Cl.
CPC ....... *G01N 21/8851* (2013.01); *F01D 21/003* (2013.01); *G01B 11/24* (2013.01);
(Continued)

(58) Field of Classification Search
CPC .............................. F01D 5/005; G01N 21/954
See application file for complete search history.

(56) References Cited

U.S. PATENT DOCUMENTS

| | | | |
|---|---|---|---|
| 5,850,469 A | 12/1998 | Martin et al. | |
| 6,278,460 B1 * | 8/2001 | Myers | G06T 15/06 345/420 |

(Continued)

FOREIGN PATENT DOCUMENTS

WO    WO2004/0599000 A3    7/2004

OTHER PUBLICATIONS

Park et al. "A range image refinement technique for multi-view 3D model reconstruction." 3-D Digital Imaging and Modeling, 2003. 3DIM 2003. Proceedings. Fourth International Conference on. IEEE, (Year: 2003).*

(Continued)

*Primary Examiner* — Fabio S Lima
(74) *Attorney, Agent, or Firm* — Fitch, Even, Tabin & Flannery LLP

(57) ABSTRACT

An optical imaging and processing system includes an optical element and a processor configured to process the plurality of image frames to generate a three-dimensional model of at least a portion of the turbine component interior. The system may also include a display coupled to the processor to display the three-dimensional model. An operator may view and analyze the three-dimensional model on the display for defects. The processor may further be configured to automatically navigate the three-dimensional model to determine defects within the turbine component interior. The system may also include a repositioning device configured to reposition the optical element such that the (Continued)

optical element may capture the plurality of image frames from multiple vantage points within the turbine component interior.

19 Claims, 6 Drawing Sheets

(51) Int. Cl.
    *G01N 21/954*     (2006.01)
    *G01N 21/95*     (2006.01)
    *F01D 21/00*     (2006.01)
    *G01B 11/24*     (2006.01)

(52) U.S. Cl.
    CPC ....... *G01N 21/954* (2013.01); *G01N 21/9515* (2013.01); *F05D 2260/80* (2013.01); *G01B 2210/52* (2013.01)

(56) References Cited

U.S. PATENT DOCUMENTS

| | | | |
|---|---|---|---|
| 7,662,091 B2 | 2/2010 | Bagley et al. | |
| 8,368,749 B2 | 2/2013 | Lambdin et al. | |
| 8,431,917 B2 | 4/2013 | Wang et al. | |
| 8,485,038 B2 | 7/2013 | Sengupta et al. | |
| 2008/0291217 A1 | 11/2008 | Vincent et al. | |
| 2011/0153206 A1* | 6/2011 | Kotaba | G01C 21/00 701/532 |
| 2012/0162192 A1* | 6/2012 | Wang | F01D 11/14 345/419 |
| 2012/0223937 A1* | 9/2012 | Bendall | G01B 11/24 345/419 |
| 2013/0080111 A1* | 3/2013 | Dunik | G06T 7/30 702/152 |
| 2013/0083055 A1 | 4/2013 | Piemonte et al. | |
| 2013/0113913 A1 | 5/2013 | Scheid et al. | |
| 2013/0114879 A1 | 5/2013 | Scheid et al. | |
| 2013/0182079 A1* | 7/2013 | Holz | G06T 7/593 348/47 |

OTHER PUBLICATIONS

Correll et al., Towards Multi-Robot Inspection of Industrial Machinery, Distributed Coverage Algorithms to Experiments with Miniature Robotic Swarms, IEEE Robotics & Automation Magazine, vol. 16, Issue 1, pp. 103-112.

Kim et al., Real-Time Visual SLAM for Autonomous Underwater Hull Inspection Using Visual Saliency, IEEE Transactions on Robotics, vol. 29, Issue 3, Jun. 2013, pp. 719-733.

Park et al., A Range Image Refinement Technique for Multi-View 3D Model Reconstruction, 3-D Digital Imaging and Modeling, IEEE Fourth International Conference on 3DIM 2003 Proceedings, 2003.

\* cited by examiner

SYSTEM AND METHOD FOR ENGINE INSPECTION

CROSS-REFERENCE TO RELATED APPLICATION

This application is a continuation of U.S. patent application Ser. No. 14/577,255, entitled "SYSTEM AND METHOD FOR ENGINE INSPECTION," filed Dec. 19, 2014, which is herein incorporated by reference in its entirety.

BACKGROUND

The subject matter disclosed herein relates to a system and method for borescope engine inspection.

Certain engines (e.g., gas turbine engines) include one or more components (e.g., a turbine) having viewing ports configured to allow monitoring of various features within the component. For example, a pyrometry system may be in optical communication with one of the viewing ports and may be configured to measure the temperature of certain components within a hot gas path of the engine. Additionally or alternatively, an optical imaging and processing system may be temporarily coupled to one of the viewing ports and used to periodically inspect the engine component for defects. Unfortunately, use of the optical imaging and processing system often requires that the engine be taken out of operation during the inspection period. To reduce the inspection period, only partial portions of the engine may be analyzed. Further, defects are often measured manually while the engine is offline. Thus, the inspection period is lengthy and may produce only partial, or locally uncorroborated, results.

BRIEF DESCRIPTION

In one embodiment, an optical imaging and processing system includes an optical connection and an optical element disposed at a first end of the optical connection. The first end of the optical connection is configured to extend into a turbine component interior such that the optical element is disposed within the turbine component interior. The system also includes a photodiode array disposed at a second end of the optical connection, where the optical element is configured to transmit a video stream of the turbine component interior to the photodiode array as the optical element is moved within the turbine component interior between multiple vantage points. The system also includes a processor coupled to the photodiode array, wherein the processor is configured to process the video stream to generate a three-dimensional model of at least a portion of the turbine component interior without utilizing a previously defined three-dimensional CAD model input of the turbine component interior.

In another embodiment, a method for generating a three-dimensional model of a turbine component interior utilizing an optical imaging and processing system includes capturing a video stream having image frames of the turbine component interior via an optical element and an array coupled to the optical element via an optical connection, where the optical element is configured to be disposed in the turbine component interior and to transmit the video stream through the optical connection to the array. The method also includes storing, in a processor of the optical imaging and processing system, the video stream having the image frames. The method also includes identifying one or more identifying features in at least a first image frame and a second image frame of the image frames. The method also includes determining corresponding identifying features between the first image frame and the second image frame. The method also includes processing the corresponding identifying features between the first image frame and the second image frame to determine relative localization data between the first image frame and the second image frame and/or the corresponding identifying features in the first and second image frames. The method further includes placing the corresponding identifying features, based on the relative localization data, into a point cloud to generate the three-dimensional model of the turbine component interior.

In a further embodiment, a method for determining defects in a turbine component interior utilizing an optical imaging and processing system includes generating a three-dimensional (3D) model of the turbine component interior, which includes capturing a video stream, via an optical element, having image frames of the turbine component interior. Generating the 3D model also includes transmitting the video stream having the image frames to a processor of the optical imaging and processing system. Generating the 3D model further includes determining identifying features in the image frames and determining corresponding identifying features between a first image frame and a second image frame of the image frames. Generating the 3D model also includes correlating the corresponding identifying features between the first image frame and the second image frame to substantially simultaneously determine relative localization data of the first and second image frames and the corresponding identifying features between the first and second image frames. Further, generating the 3D model also includes locating the corresponding identifying features, based on the relative localization data, into a point cloud to form the 3D model of the turbine component interior.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
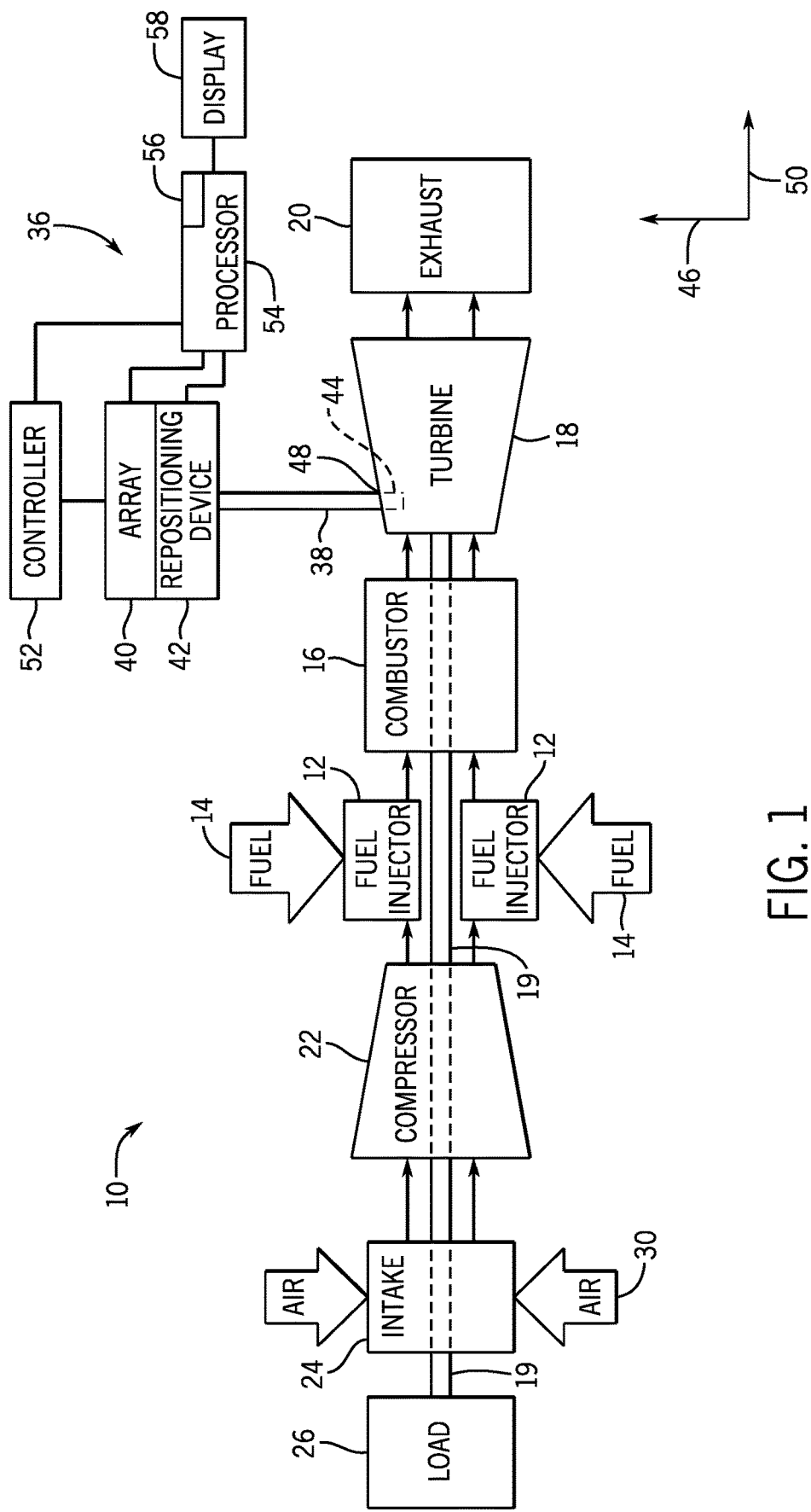
FIG. 1 is a block diagram of an embodiment of a turbine system including an optical imaging and processing system and image processing unit.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

Embodiments disclosed herein may enhance inspection of engine components (e.g., turbine components) by providing an optical imaging and processing system capable of capturing a video stream of the turbine component(s) and processing the video stream to generate a three-dimensional (3D) model of the turbine component(s), for example, without the assistance of a pre-defined 3D CAD model input (although, in some embodiments, a 3D CAD model may be used to refine the generated 3D model into a refined 3D model). In one embodiment, the optical imaging and processing system is configured to optically communicate with (e.g., capture video of) an interior of a turbine. For example, the optical imaging and processing system includes a lens, camera, or prism configured to be inserted into the interior of the turbine through a viewing port. The lens may be coupled to an optical connection that extends from the lens to a component of the optical imaging and processing system external to the turbine's interior, where the optical connection may be enveloped by or include a rigid or flexible shaft or coating for protecting the optical connection from objects external to the turbine's interior. The lens is coupled to the optical connection and may also be physically coupled to the shaft, for example, at one or more connection points along a perimeter of the lens, or at some other connection point. The shaft or coating may be coupled on one end to the lens and on an opposing end to an array (e.g., an imaging or photodiode array) configured, for example, to at least temporarily store the video stream transmitted from the lens, through the optical connection, and to the imaging array. In other words, the optical connection may extend from the lens to the array, such that video may be transmitted to the array via the optical connection.

Further, the optical imaging and processing system in a presently contemplated embodiment may include a repositioning device. The repositioning device may be capable of repositioning a number of different components of the optical imaging and processing system, such that video of large portions (or substantially all) of the turbine interior may be captured. For example, the repositioning device may be configured to reposition the lens within the interior of the turbine. The repositioning device may be configured to rotate the lens about a longitudinal axis extending through the optical connection, which may be done by rotating the optical connection itself with which the camera/lens is attached. In some embodiments, the repositioning device is also capable of tilting the lens in any direction about a center point of the lens. For example, the lens may be pivotable about a center point of the lens, in any direction about the center connection point. Accordingly, the lens may redirect light toward an area of the turbine interior intended to be video captured. The repositioning device may also extend and contract the shaft of the optical connection, such that the lens may be inserted into a deeper or shallower portion, respectively, of the interior of the turbine, with respect to the viewing port. Further, the repositioning device may be configured to tilt or pivot the shaft about the viewing port, using the viewing port as a pivot or lever, which may alter a position of the lens in the turbine interior. Accordingly, video may be captured of large portions of the turbine interior or turbine component from a number of different vantage points.

Additionally or alternatively, the lens may be repositioned manually via an operator. For example, the operator may hold an end of the optical connection (or shaft thereof) and move the optical connection within the turbine component interior, thereby moving the lens within the interior. The operator may translate the shaft enveloping the optical connection forwards and backwards and side to side. The operator may also rotate the shaft and/or actuate changes in an orientation of the lens within the turbine component interior.

It should be noted that the turbine may include one viewing port and that a portion or all of the turbine component interior may be captured via the optical imaging and processing system from the single viewing port. In certain embodiments, depending on factors relating to a geometry of the turbine component interior and factors relating to the captured video stream(s), more than one viewing port may be utilized to generate multiple 3D modeled areas of the gas turbine interior. Depending on the embodiment, the multiple 3D modeled areas of the gas turbine interior may be analyzed separately or, if certain similarities between the captured video streams of the multiple areas are available, may be corroborated or correlated for piecing the multiple areas together. For simplicity, presently disclosed embodiments may be described mostly with relation to an optical imaging and processing system configured to generate a 3D model of the turbine component interior via a single viewing port.

After capturing and storing video of the turbine interior, the video clip (e.g., video stream) may be transmitted from the array to a processor. In some embodiments, the array may be a part of the processor, or the video stream may be transmitted directly from the lens to the processor. The processor receives the video stream and analyzes each image frame of the video stream to generate the 3D model of the turbine component interior. Because the optical imaging and processing system may be moved within the viewing port manually via an operator to capture the video of the turbine component interior, an exact position and orientation of the lens of the optical imaging and processing system is not known. Accordingly, the processor iteratively determines, substantially simultaneously, a relative position and orientation of the camera lens and certain identifying features captured in the image frames of the video stream, such that the processor may generate the 3D model by positioning the certain identifying features captured in the video stream (and, thus, image frames thereof) into a point cloud that eventually forms the 3D model. This process will be described in detail below with reference to the figures.

Turning now to the drawings, FIG. 1 is a block diagram of an embodiment of a turbine system 10 including an optical imaging and processing system configured to capture video of a turbine interior and generate a 3D model via processing of the video. While the turbine system is described below, it should be appreciated that the optical imaging and processing system may be utilized to monitor components within other rotary machines or turbo machines, such as a compressor, a jet engine, a pump, or a steam turbine, for example. The illustrated turbine system 10 includes fuel injectors 12, a fuel supply 14, a combustor 16 (or multiple combustors 16), a turbine 18, a shaft 19 (or multiple shafts 19), an exhaust outlet 20, a compressor 22, an air intake 24, and a load 26.

As illustrated, the turbine system 10 includes an optical imaging and processing system 36. The optical imaging and processing system 36 may be utilized for capturing video of any of the turbine system 10 components listed above. For example, the optical imaging and processing system 36, in accordance with the present disclosure, is capable of capturing video of the fuel injectors 12, the fuel supply 14, the combustor(s) 16, the turbine 18, the shaft(s) 19, the exhaust outlet 20, the compressor 22, the air intake 24, or any other component of the turbine system 10. In the illustrated embodiment, the optical imaging and processing system 36 is optically coupled to the turbine 18 for capturing video of an interior of the turbine 18. For example, the illustrated optical imaging and processing system 36 includes an optical connection 38 (e.g., borescope, endoscope, fiberscope, etc.) extending from an array 40 (e.g., an imaging or photodiode array) and a repositioning device 42 into the turbine 18. The optical connection 38 may include optical fibers and a shaft or protective exterior coating or layer, where the optical fibers are housed within the shaft or coating for protecting the optical fibers.

As discussed in detail below, a lens 44 (e.g., prism, mirror, camera, etc.) is coupled to an end of the optical connection 38, and configured to redirect a field of view toward different regions of a component within the interior of the turbine 18. In general, the lens 44 is inserted into the interior of the turbine 18 when the turbine system 10 is off-line. The repositioning device 42 may be configured to tilt the lens 44 about a center of the lens 44 in any direction, such that the lens 44 may point to a number of different regions within the turbine 18. Further, the repositioning device 42 may be configured to extend or contract the optical connection 38, such that the lens 44 may be inserted into a deeper or shallower portion, respectively, of the turbine 18 interior. For example, in the illustrated embodiment, the repositioning device 42 may be capable of contracting the optical connection 38 in direction 46 or extending the optical connection 38 opposite to direction 46. The repositioning device 42 may also be capable of tilting or pivoting the optical connection 38 about a viewing port 48 of the turbine 18 through which the lens 44 and the optical connection 38 extend. In doing so, the lens 44 may be translated in direction 50 or opposite direction 50, depending on the action taken by the repositioning device 42. Further still, the repositioning device 42 may be capable of rotating the optical connection 38 itself (e.g., or the shaft thereof, as previously described) about a longitudinal axis 51 extending through the optical connection 38, which may rotate the lens 44 coupled to the optical connection 38.

It should be noted, however, that the lens 44 may be translated, rotated, or otherwise moved within an interior of the turbine system 10 (or turbine 18, or other component of the turbine system 10) manually. For example, an operator may manually insert the lens 44 into the turbine 18 via the optical connection 38. During video capture, the operator may translate, rotate, or otherwise move the lens 44 within the turbine 18 interior to capture video of various portions of the turbine 18 interior from various vantage points, as described below.

It should also be noted that, in some embodiments, the turbine 18 may include multiple viewing ports 48. Although the repositioning device 42 (or manual operator) may be capable of expanding the field of view of the lens 44 within one viewing port 48 by moving the lens 44, and may enable the lens 44 to capture video of a particular region of the turbine 18 from a number of different vantage points with a single continuous video stream, multiple viewing ports 48 may be beneficial in generating a comprehensive view of the entirety, or multiple portions, of the turbine 18 interior. Accordingly, multiple viewing ports 48 may be strategically positioned about the turbine 18, such that the entire turbine 18 interior, or a larger portion thereof, or multiple portions thereof, may be captured via multiple video streams and stored to the array 40. Each video stream may be separately processed for generating separate models of the interior of the turbine 18 which, depending on certain factors, may or may not be corroborated (e.g., correlated) via subsequent processing to combine the separate models.

Any action taken by the repositioning device 42 or array 40 may be instructed via a controller 52, which may be separate or integral with a processor 54. For example, the processor 54 may include executable instructions stored in memory 56 of the processor 54. The instructions may execute on the processor 54, and the controller 52 may act on the executed instructions, such as to execute a turbine inspection or turbine visualization protocol. Accordingly, the controller 52 may carry out the instructions stored on the processor 54 by instructing the array 40 and/or the repositioning device 42 to perform various functions described above. However, as described above and in detail below, a manual operator may move the lens 44 within the turbine 18 interior manually. Additionally or alternatively, a manual operator may manually control the controller 52. The manual operator may also manually begin and end video capture.

The processor 54 in presently contemplated embodiment is also capable of processing images/video stored in the array 40 (or, in some embodiments, sent directly to the processor 54 from the lens 44). For example, the controller 52 may instruct the array 40 to transmit the captured video clips to the processor 54. Alternatively, the video clip (e.g., stream) may automatically transmit from the array 40 to the processor 54. The processor 54 may then execute a number of instructions for processing the video clip. In doing so, the video clip may be processed such that a point cloud is generated, which eventually forms the 3D model of the turbine 18 interior as described below. The 3D model, in certain embodiments, may then be transmitted to a display 58 for viewing and analyzing. The processing method utilized to generate the point cloud (and, thus, the 3D model) from the captured video will be described in detail with reference to later figures (e.g., FIGS. 3-7).

Figure 2:
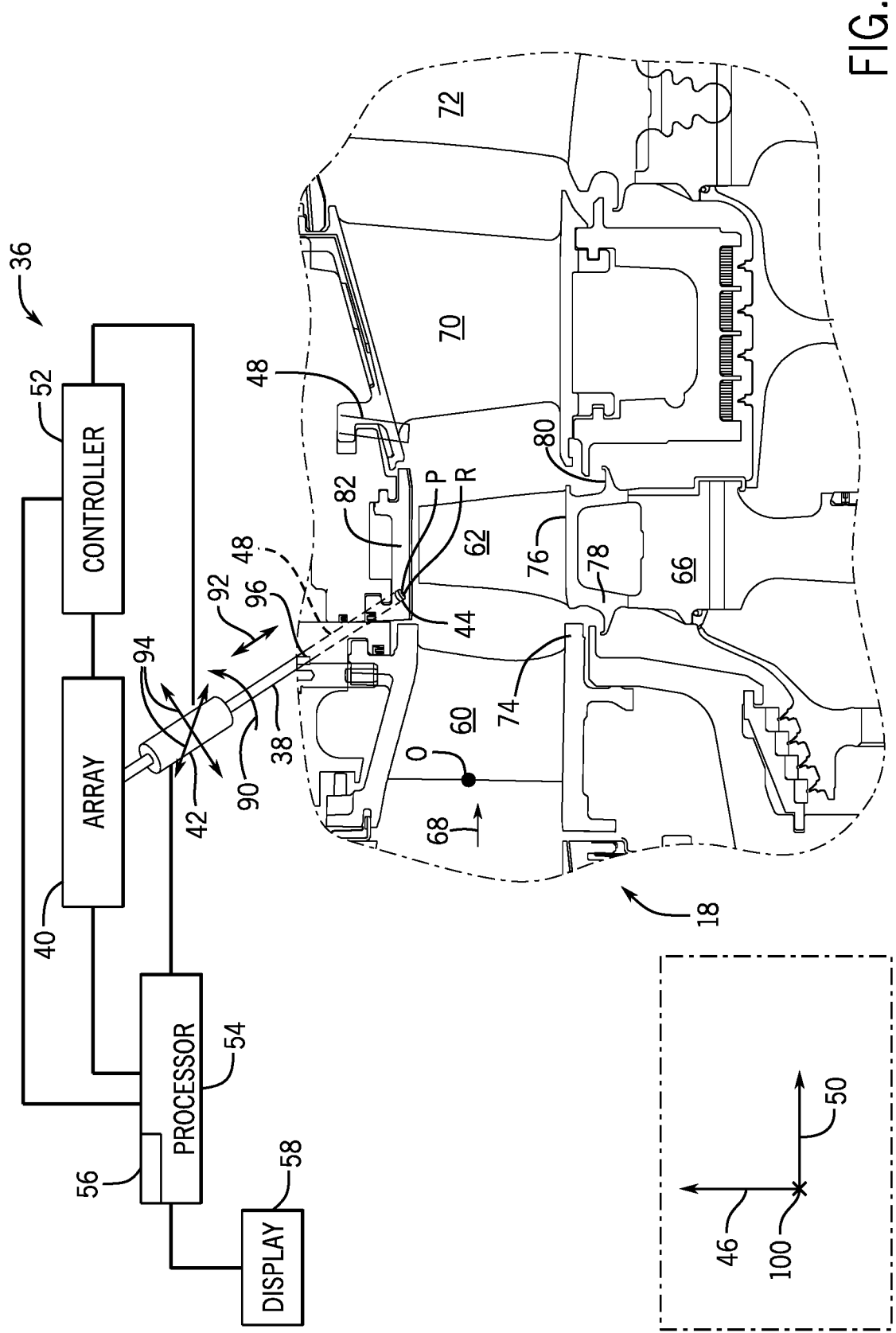
FIG. 2 is a cross-sectional view of an exemplary turbine section, along with the optical imaging and processing system and image processing unit of FIG. 1.

FIG. 2 is a cross-sectional side view of an exemplary turbine section illustrating various turbine components that may be monitored by the optical imaging and processing system 36. The following discussion, with reference to FIG. 2, is intended to provide some context for an exemplary portion of a component of the turbine system 10 (of FIG. 1) that may be monitored via the optical imaging and processing system 36. However, it should be noted that the presently disclosed optical imaging and processing system 36 is capable of monitoring any component of any engine (e.g., turbine engine or system). The illustrated turbine 18 includes at least two stages, with the first two stages shown in FIG. 2. Other turbine configurations may include more or fewer turbine stages. The first turbine stage includes first stage vanes 60 and first stage blades 62 substantially equally spaced in a first circumferential direction 64 about the turbine 18. The first stage vanes 60 are rigidly mounted to the turbine 18 and configured to direct combustion gases toward the first stage blades 62. The first stage blades 62 are mounted to a rotor 66 that is driven to rotate by hot gas stream 68 flowing through the first stage blades 62. The rotor 66, in turn, is coupled to the shaft 19, which drives the compressor 22 and the load 26 (as shown in FIG. 1). The hot gas 68 then flows through second stage vanes 70 and second stage blades 72. The second stage blades 72 are also coupled to the rotor 62. As the hot gas stream 68 flows through each stage, energy from the gas is converted into rotational energy of the rotor 62. After passing through each turbine stage, the hot gas 68 exits the turbine 18 in the axial direction 50.

In the illustrated embodiment, each first stage vane 60 extends outward from an endwall 74 in direction 46. The endwall 74 is configured to block hot gas 68 from entering the rotor 66. A similar endwall may be present adjacent to the second stage vanes 70, and subsequent downstream vanes, if present. Similarly, each first stage blade 62 extends outward from a platform 76 in direction 46. As will be appreciated, the platform 76 is part of a shank 78 which couples the first stage blade 62 to the rotor 66. The shank 78 also includes a seal 80, or angel wing, configured to block hot gas 68 from entering the rotor 66. Similar platforms and angel wings may be present adjacent to the second stage blades 72, and subsequent downstream blades, if present. Furthermore, a shroud 82 is positioned radially outward from the first stage blades 62. The shroud 82 is configured to minimize the quantity of hot gas 68 that bypasses the first stage blades 62. Gas bypass is undesirable because energy from the bypassing gas is not captured by the first stage blades 62 and translated into rotational energy. While embodiments of the optical imaging and processing system 36 are described below with reference to monitoring components within the turbine 18 of a gas turbine engine 10, it should be appreciated that the optical imaging and processing system 36 may be employed to monitor components within other rotary machines, such as a jet engine, a steam turbine or a compressor, for example.

As illustrated, the optical connection 38 of the optical imaging and processing system 36 extends into an interior of the turbine 18 through one of the inspection ports 48, such that the lens 44 may be disposed within the interior of the turbine 18. It should be noted that, in general, in accordance with the present disclosure, the turbine 18 is shut down before inserting the optical connection 38 through the inspection port 48 and before video capture of the turbine 18 interior. The presently disclosed optical imaging and processing system 36 is intended, at least in part, to reduce an amount of time the turbine 18 (and/or turbine system) is off-line. As will be appreciated, inspection ports 48 may be positioned at various locations along the turbine casing to facilitate inspection of turbine components while the turbine is deactivated, although the 3D model or a portion of the 3D model may be generated from a continuous video stream generated from video capture taken through a single inspection port 48.

While the optical connection 38 is directed toward the first stage blades 62 in the illustrated embodiment, it should be appreciated that the lens 44 and optical connection 38 may be directed toward other turbine components in alternative embodiments. In other words, presently disclosed embodiments are capable of capturing video (and generating the 3D model) of any component of the turbine system 10 and/or of any component of the turbine 18 interior. For example, the optical imaging and processing system 36, in certain embodiments, may be used to capture video of components within an interior of the compressor 22 (e.g., compressor blades, vanes, etc.) and/or an interior of the combustor 16 (e.g., liner, fuel nozzle, etc.).

As indicated by arrow 90, the optical connection 38 may be rotated to turn the lens 44 within the turbine 18 interior. For example, the repositioning device 46 may automatically rotate the optical connection 38, or an operator may manually rotate the optical connection 38. Accordingly, the orientation of the lens 44 may be changed over time during video capture. As indicated by arrow 92, the optical connection 38 may be moved inwardly and outwardly to change a depth of the lens 44 within the turbine 18 interior. Further, as indicated by arrows 94, the optical connection 38 may be pivoted to change a position of the lens 44 within the turbine 18 interior. For example, the optical connection 38 may pivoted about a connection point 96 between the optical connection 38 and the viewing port 48 of the turbine 12. The repositioning device 46 may automatically move and/or pivot the optical connection 38, or an operator may manually move and/or pivot the optical connection 38. In doing so, the lens 44 may be biased toward a deeper portion of the turbine 18 interior or a shallower portion of the turbine 18 interior, and the lens 44 may be moved to different positions within the turbine 18 interior. Any movement of the lens 44 within the turbine 18 interior may be done to capture a larger portion of the turbine 18 interior. For example, the lens 44 may be moved about the turbine 18 interior while capturing video of the turbine 18 interior, thereby increasing an area of the turbine 18 interior captured via video for processing to generate the 3D model.

Figure 3:
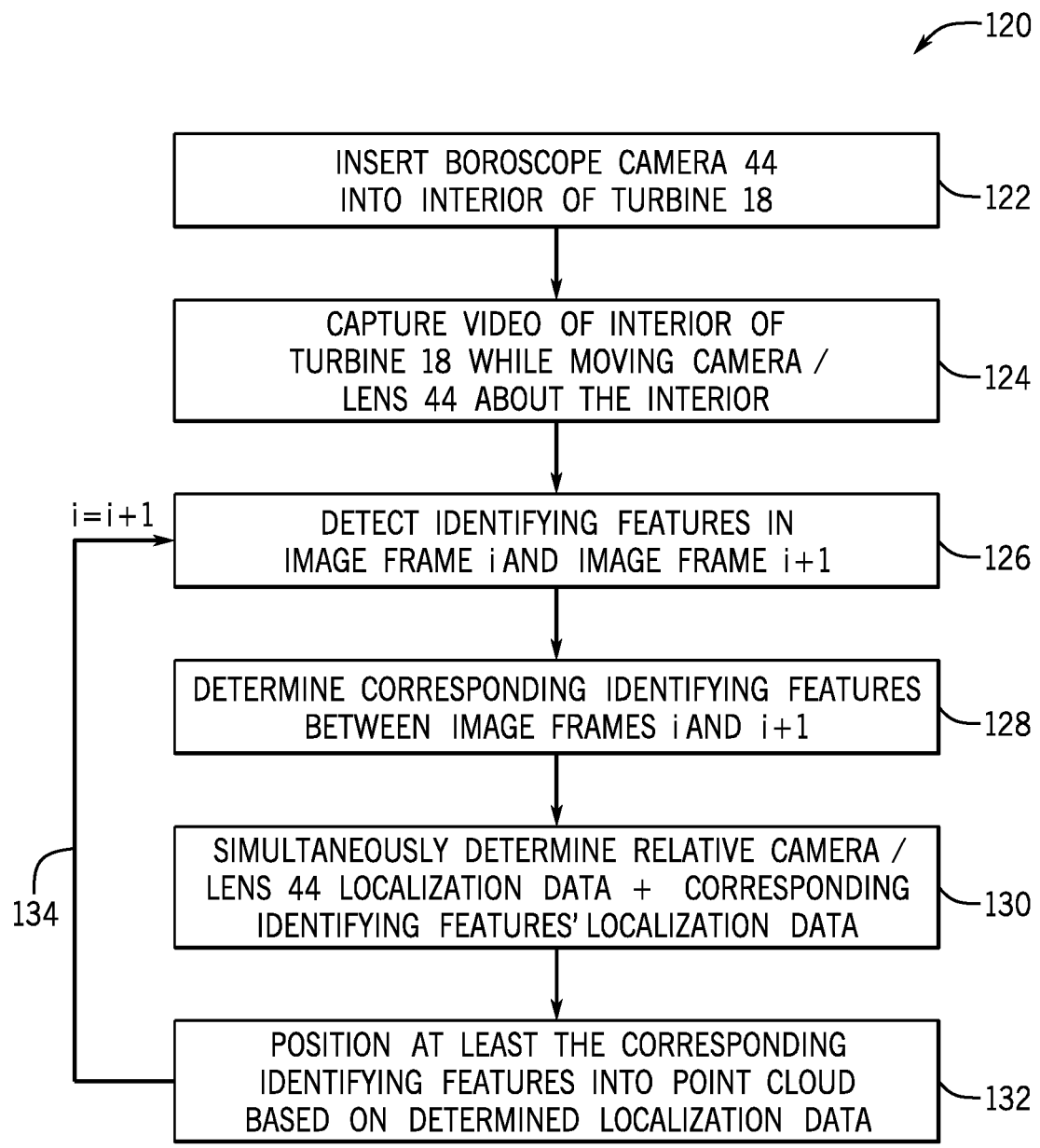
FIG. 3 is process flow diagram illustrating an exemplary method of capturing and processing images of the turbine system of FIG. 1.

Turning now to FIG. 3, an embodiment of a method 120 for producing the three-dimensional (3D) model of the turbine 18 interior (or any other turbine system 10 component) via video capture and processing is shown. It should be noted that the following method 120 includes basic discussion of processing the captured video to generate the 3D model, but that a more detailed description of certain ones of the various processing steps shown in FIG. 3 will be set forth with reference to later figures. In other words, some of the steps described in the illustrated method 120 will be described individually and/or in combination with other steps in greater detail with reference to later figures (e.g., FIGS. 4-7).

In the illustrated embodiment, the method 120 includes inserting the lens 44 (e.g., prism, mirror, camera, etc.) into the interior of a turbine or turbine engine (block 122). More specifically, the lens 44 may be inserted, for example, into the interior of the turbine 18 of the turbine engine 12. The optical imaging and processing system 36 may record a video sequence (e.g., a continuous video sequence) while the lens 44 is within the turbine 18 interior (block 124). For example, the lens 44 may be coupled to the optical connection 38, which extends through the viewing port 48 into the turbine 18 interior. An operator may hold the optical connection 38 (or a protective shaft around the optical connection 38) to manually move the lens 44 within the turbine 18 interior. The method 120 also includes detecting identifying features in image frames of the video sequence (block 126). For example, the video stream may be transmitted to the array 40 (e.g., from the lens 44) of the optical imaging and processing system 36, and subsequently to the processor 54. Alternatively, the video sequence may be directly transmitted to the processor 54 from the lens 44. The processor 54 may then segment the various image frames of the video sequence and process two image frames (e.g., two adjacent time-sequentially ordered image frames). For example, the processor 54 may simultaneously process a first image frame of the video sequence and a second image frame of the video sequence immediately following the first image frame in time-sequential order. The processor 54 may detect identifying features in each of the two image frames and then determine corresponding identifying features between the two frames (block 128). The identifying features may be a pixel or a group of pixels that stand out (e.g., are clearly differentiated) from immediately adjacent pixels or groups of pixels. For example, the identifying features may be identified based on a color or RGB value(s). Further, it should be noted that a number of identifying features may be determined in the two image frames, and a number of corresponding identifying features between the two image frames may be determined via the processor 54.

Continuing with the illustrated embodiment, the method 120 includes simultaneously determining (or estimating) relative camera/lens 44 localization data (e.g., position and orientation) between the two image frames and relative localization data between the corresponding identifying features of the two image frames (e.g., position and orientation) (block 130). For example, the processor 54 may utilize the first image frame to set an initial reference frame for the position and/or orientation of the lens 44. The second image frame is then compared with the first image frame until the corresponding identifying features in the first and second image frames at least partially coordinate. For example, the second image frame (or the corresponding identifying features thereof) may be translated, rotated, and/or scaled until the second image frame (or the corresponding identifying features thereof) coordinates with the first image frame (or the corresponding identifying features thereof). The translation, rotation, and scaling of the second image frame (or the corresponding identifying features thereof) are utilized to determine a relative position and orientation of the camera lens 44 from the second image frame compared to the first image frame. Further, the translation, rotation, and scaling is also used to determine a relative position (including depth) and orientation (e.g., within the turbine 18 interior) of the corresponding identifying features. These relationships (e.g., between the translation/rotation/scaling factors and the localization data of the corresponding identifying features) may be deduced geometrically. Generally, epipolar geometry is utilized, by the processor 54, to process the images in the manner described above.

After simultaneously determining the camera lens 44 relative localization data and the corresponding identifying features relative localization data between the first two image frames, the corresponding identifying features are placed into a point cloud (block 132). For example, the point cloud's initial reference frame may be based on the first image's reference frame, as the first and second images are compared, in accordance with the description above, to determine relative positions and orientations of the lens 44 and relative positions and/or orientations of the corresponding identifying features. After the corresponding identifying features are placed into the point cloud, the process may be repeated between the second image frame a third image frame immediately following the second image frame in time-sequential order, where the second image frame serves as the reference frame (step 134). Since the relative lens 44 localization data between the first and second images has already been geometrically determined, the corresponding identifying features between the second and third image frames can be assigned localization data within the point cloud based, in part, on the comparison of the first and second image frames. For example, relationships between the second image frame's reference frame and the first image frame's reference frame have been geometrically deduced, and the second image frame serves as the initial reference frame in the processing of the second and third image frames.

It should be noted that, because each subsequently processed pair of images depends on the processing of the previous pair of images (e.g., as described above), reference frames of the images are all relatively compared based on the initial reference frame of the first image. Accordingly, because the reconstruction is relative, dimensions of the point cloud (and, thus, the 3D model being generated) would be unknown without a reference object in at least one of the images. Thus, one or more reference objects of known length may be inserted into, or identified within, one or more of the images. The reference object may be a physical feature of the turbine component, or may be another indicator of known length. For example, a laser dot pattern of known dimension(s) may project from the lens 44 onto the turbine component during video capture, such that the video includes the laser dot pattern in one or more images. The laser dot pattern is then used as the reference object for determining a scale (e.g., size or dimension) of the point cloud and features thereof.

In some instances, the corresponding identifying features placed into the point cloud after comparison of the second and third image frames may at least partially conflict with the corresponding identifying features placed into the point cloud following comparison of the first and second image frames. By iteratively comparing a large number of the image frames (e.g., by having a longer video stream), conflicting data between some of the iterations can be overcome by corresponding data between a greater number of the iterations. Eventually, more and more corresponding identifying features are placed into the point cloud until the point cloud forms the 3D model.

Figure 4:
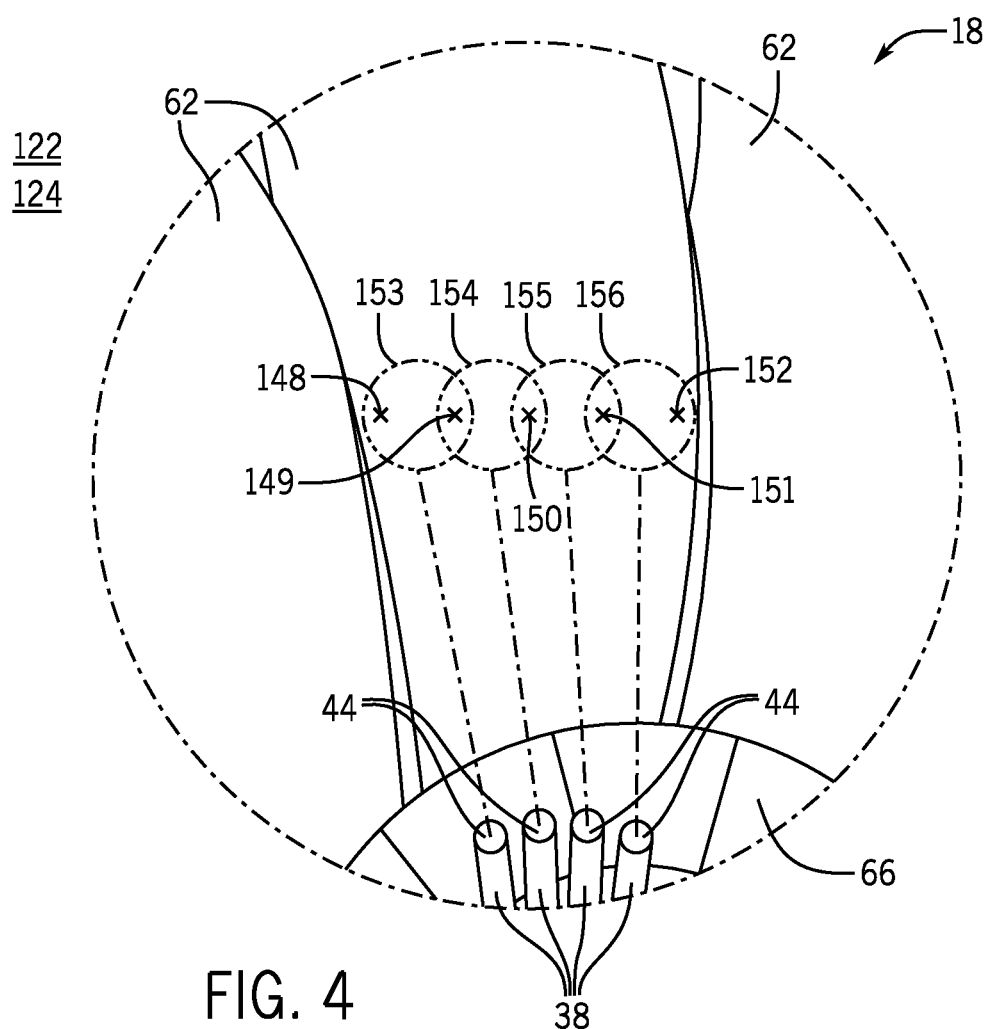
FIG. 4 is a front view of an exemplary turbine section, along with portions of the optical imaging and processing system of FIG. 1.

Turning now to FIG. 4, a front view of an embodiment of a portion of the turbine 18 interior, along with portions of the optical imaging and processing system 36 (e.g., lens 44 and optical connection 38), is shown. It should be noted that the illustrated lens 44 and optical connection 38 is the same lens 44 and optical connection 38, respectively, being moved through the interior of the turbine 18 over time (e.g., during video capture). In the illustrated embodiment, at least steps 122 and 124 of the previously described method 120 are considered. The lens 44 is shown taking or transmitting a continuous video stream of portions of the turbine 18 interior, where the turbine interior includes the first stage blades 62 disposed about the rotor 66. In the illustrated embodiment, five identifying features 148, 149, 150, 151, 152 are shown. The lens 44 captures the identifying features 148, 149, 150, 151, 152 in a continuous video stream including at least image frames 153, 154, 155, and 156. It should be noted that, for simplicity of discussion, only five identifying features 148, 149, 150, 151, 152 are shown across all four image frames 153, 154, 155, 156. However, in practice, many more identifying features are generally identified in each image frame 153, 154, 155, 156. For example, in some embodiments, most or substantially all of the pixels in each image frame 153, 154, 155, 156 may be identified as an identifying feature, or part of an identifying feature, such that a dense feature set is processed by the processor 54. This may increase processing accuracy, as more features are available for processing in accordance with the description below.

Figure 5:
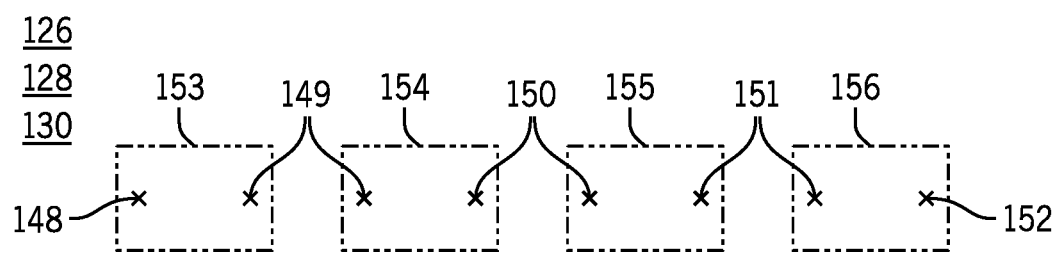
FIG. 5 is an illustration of exemplary image frames from a video stream taken by the optical imaging and processing system of FIG. 1.
Figure 6:
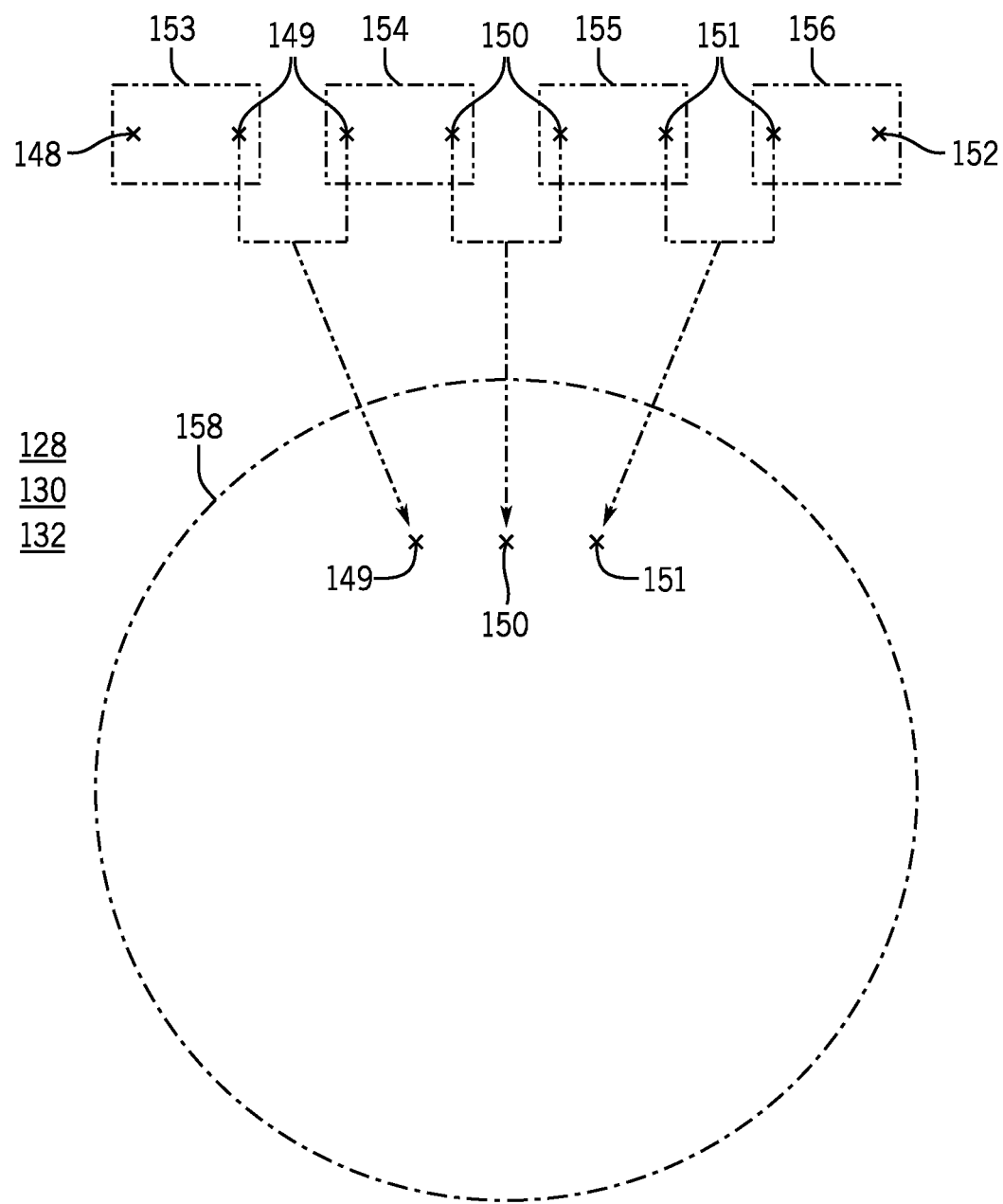
FIG. 6 is an illustration of the exemplary image frames from the video in FIG. 5 being processed to form a point cloud.

In FIG. 5, the identifying features 148, 149, 150, 151, and 152 are detected in the image frames 153, 154, 155, and 156 via the processor 54, as described in block 126 in FIG. 3. The processor 54 begins the iterative process of determining corresponding identifying features (block 128 of FIG. 3) between two image frames and simultaneously determining relative localization data of the lens 44 between successive image frames and the corresponding identifying features between successive image frames, as described in block 130 in FIG. 3. For example, the processor 54 may begin the iterative process with image frames 153 and 154. The processor 54 may detect identifying features 148 and 149 in frames 153 and 154 and determine corresponding identifying features between the two frames 153, 154. For example, the processor 54 determines, in the illustrated embodiment, that the identifying feature 149 is found in both image frame 153 and 154. The processor 54 may process the two image frames 153, 154 to correlate the corresponding identifying feature 149 by translating, rotating, and/or scaling the corresponding identifying feature 149 in the second image frame 154 until it correlates (e.g., matches, corresponds, etc.) with the corresponding identifying feature 149 in the first image frame 153, where the first image frame 153 serves as the initial reference frame. The translation/rotation/scaling factors may be utilized by the processor 54 to substantially simultaneously determine relative localization data (e.g., position and/or orientation) between the two image frames 153, 154 and relative localization data (e.g., position (including depth) and/or orientation) of the corresponding identifying feature 149 in the two image frames 153, 154. The corresponding identifying feature 149 may then be placed into a point cloud 158, as shown in FIG. 6, using the first image frame 153 as the initial reference frame. In accordance with previous discussion, the process is repeated between the second and third image frames 154 and 155 (having corresponding identifying features 150), where the second image frame 154, which has already been related geometrically to the first image frame 153, serves as the initial reference frame. The process may again be repeated between the third and fourth image frames 155 and 156 (having corresponding identifying feature 151), where the third image frame 155, which has already been geometrically related to the second image frame 154 (which has already been related to the first image frame 153), serves as the initial reference frame. The process may be repeated for a number of image frames to continue populating the point cloud 158.

In FIG. 6, the iterative process is continued, in accordance with the description above, as corresponding identifying features (e.g., corresponding identifying features 149, 150, 151) are placed into the point cloud 158. It should be noted that, in some embodiments, a number of corresponding identifying features may be determined between each pair of image frames being processed. Further, it should be noted that, after certain corresponding identifying features are placed into the point cloud 158, the point cloud 158 may include conflicting information or data. For example if a particular corresponding identifying feature is found in three or more image frames, a corresponding identifying feature that has already been placed into the point cloud 158 may be subsequently placed into the point cloud 158 again after subsequent processing of subsequent images. In some instances, the subsequent placement of the same corresponding identifying feature into the point cloud 158 may conflict with the same, prior placed corresponding identifying feature. However, as more and more image frames are processed over time, the point cloud 158 may be refined as outlying data is overcome by a larger number of correlating (e.g., matching, corresponding, etc.) data. Further, in some embodiments, the 3D model generated via the point cloud may be refined after the above-described processing with the assistance of a 3D CAD model. For example, the processor 54 may generate the point cloud 158 and, thus, the 3D model, as described above, and then compare the 3D model with a pre-existing 3D CAD model input. The processor 54 may determine inconsistencies between the generated 3D model and the 3D CAD model input, and may refine the generated 3D model to produce a refined 3D model.

Figure 7:
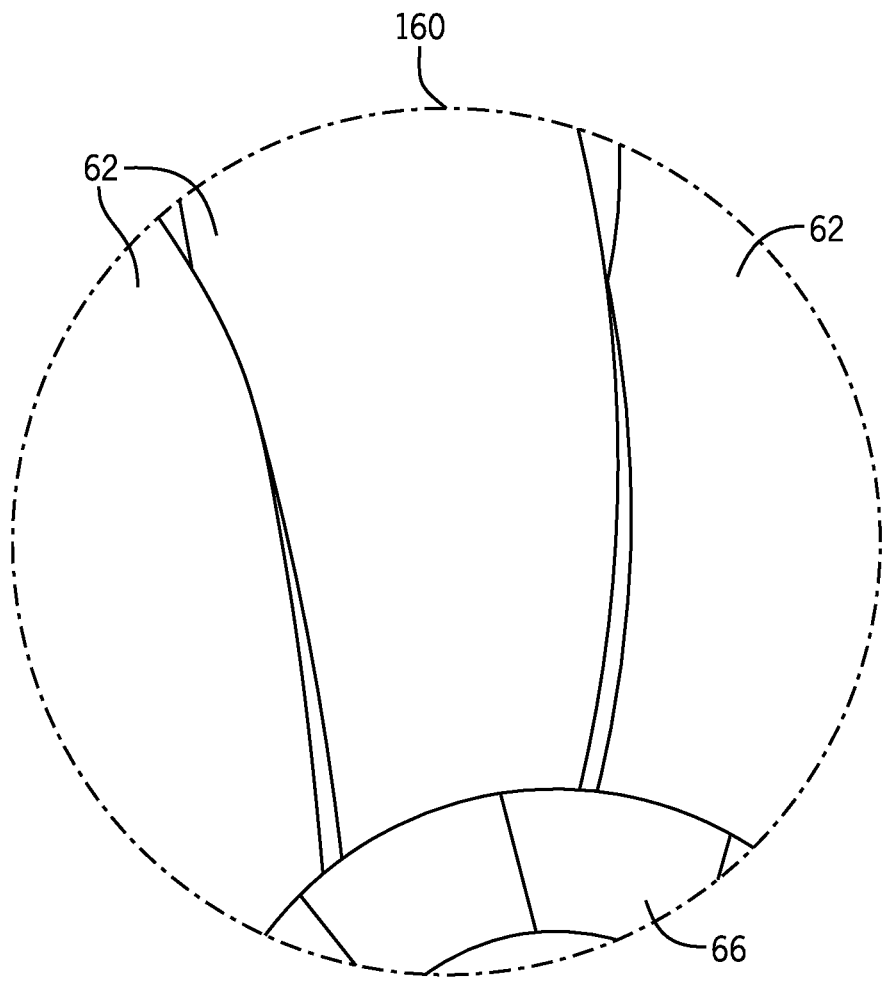
FIG. 7 is an illustration of a fully processed point cloud from FIG. 6 forming a three-dimensional model of the turbine section of FIG. 4.

An example of the point cloud 158 forming a navigable 3D model 160 is shown in FIG. 7. The navigable 3D model 160 may be shown on a display (e.g., display 58 in FIG. 2), such that an operator may view the model 160 and analyze the model 160 for defects. Additionally or alternatively, in some embodiments, the processor 54 may automatically navigate the model 160 to determine defects.

In accordance with the present disclosure, an optical imaging and processing system is capable of generating a three-dimensional (3D) model of a turbine component (or interior thereof) without the assistance of a pre-defined CAD model input. For example, the processor iteratively processes a number of image frames from a continuous video stream to form a point cloud, which eventually forms the navigable 3D model. However, in some embodiments, to enhance accuracy, the generated 3D model may be refined with the assistance of the 3D CAD model, if available. For example, the 3D model may be generated in accordance with the present disclosure (e.g., without the use of the CAD model), and then may be refined or fine tuned via the assistance of a 3D CAD model to generate a refined 3D model. In general, disclosed embodiments may reduce an amount of time the engine is off-line during inspection. For example, instead of measuring each defect manually, operators can capture video of the engine interior or component and the video can be processed, in accordance with the present disclosure, to generate an accurate 3D model of the turbine interior or component and the component's defects.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An optical imaging and processing system, the system comprising:
   an optical element configured to capture a plurality of image frames of a turbine component interior; and
   a processor configured to:
   capture a video stream having a plurality of image frames of the turbine component interior via an optical element, wherein the optical element is configured to be disposed in the turbine component interior and to transmit the video stream to the processor;
   store the video stream having the plurality of image frames; and
   process the plurality of image frames to generate a three-dimensional model of at least a portion of the turbine component interior, comprising:

identify one or more identifying features in at least a first image frame and a second image frame of the plurality of image frames;
determine corresponding identifying features between the first image frame and the second image frame;
process the corresponding identifying features between the first image frame and the second image frame to simultaneously determine relative localization data between the first image frame and the second image frame and the corresponding identifying features in the first and second image frames; and
place the corresponding identifying features, based on the relative localization data, into a point cloud for generating the three-dimensional model of the turbine component interior.

2. The system of claim 1, the system further comprising:
a photodiode array, wherein the optical element is configured to transmit a video stream of the turbine component interior to the photodiode array as the optical element is moved within the turbine component interior between multiple vantage points.

3. The system of claim 2, wherein the photodiode array comprises part of a camera.

4. The system of claim 1, comprising a display coupled to the processor, wherein the display is configured to display the three-dimensional model.

5. The system of claim 1, wherein the processor is configured to automatically navigate the three-dimensional model to determine defects within the turbine component interior.

6. The system of claim 1, wherein the image frames comprise at least a first image frame, a second image frame, and a third image frame, wherein the first and second image frames are processed by the processor first to locate corresponding identifying features between the first and second image frames in the point cloud, and wherein the second and third image frames are processed second to locate corresponding identifying features between the second and third image frames in the point cloud.

7. The system of claim 1, the system further comprising:
a repositioning device configured to reposition the optical element such that the optical element may capture the plurality of image frames from multiple vantage points within the turbine component interior.

8. The system of claim 1, wherein the processor compares a three-dimensional model input of the turbine component interior with the three-dimensional model generated by the processor to refine the three-dimensional model into a refined three-dimensional model.

9. The system of claim 1, the system further comprising:
a controller, wherein the processor comprises instructions, and wherein the controller carries out the instructions.

10. A method for generating a three-dimensional model of a turbine component interior
utilizing a processor of an optical imaging and processing system, comprising:
capturing a video stream having a plurality of image frames of the turbine component interior via an optical element, wherein the optical element is configured to be disposed in the turbine component interior;
generating the three-dimensional model of the turbine component interior;
identifying one or more identifying features in at least a first image frame and a second image frame of the plurality of image frames;
determining corresponding identifying features between the first image frame and the second image frame;
processing the corresponding identifying features between the first image frame and the second image frame to simultaneously determine relative localization data between the first image frame and the second image frame and the corresponding identifying features in the first and second image frames; and
placing the corresponding identifying features, based on the relative localization data, into a point cloud for generating the three-dimensional model of the turbine component interior,
placing the corresponding identifying features, based on the relative localization data, into a point cloud.

11. The method of claim 10, wherein processing the corresponding identifying features between the first image frame and the second image to determine relative localization data between the first image frame and the second image frame and/or the corresponding identifying features in the first and second image frames comprises:
setting the first image frame as an initial reference frame and translating, rotating, and/or scaling the corresponding identifying features from the second image frame to correlate with the corresponding identifying features in the first image frame;
storing translation, rotation, and/or scaling factors related to the translating, rotating, and/or scaling of the corresponding identifying features from the second image frame; and
utilizing the translation, rotation, and/or scaling factors to determine the relative localization data between the first image frame and the second image frame and/or the corresponding identifying features in the first and second image frames.

12. The method of claim 11, the method further comprising:
processing the plurality of image frames to determine a relative position and orientation of the optical element;
determining identifying features in the plurality of image frames to substantially simultaneously determine relative localization data of the plurality of image frames and the identifying features between each of the plurality of image frames;
locating the identifying features, based on the relative localization data and the relative position and orientation of the optical element, into a point cloud to form the three-dimensional model of the turbine component interior; and
processing a first image and a second image in the plurality of image frames, then the second image frame and a third image frame, then the third image frame and a fourth image frame, and so on and so forth, such that the point cloud forms the three-dimensional model.

13. The method of claim 10, the method further comprising:
repositioning the optical element, disposed within the turbine component interior through a single viewing port, via a repositioning device of the optical imaging and processing system, such that the optical element may capture the plurality of image frames from multiple vantage points within the turbine component interior.

14. The method of claim 10, comprising displaying the three-dimensional model on a display coupled to the processor.

15. The method of claim 14, wherein navigating the three-dimensional model to determine defects within the turbine component interior comprises the processor automatically navigating the three-dimensional model, an operator viewing and analyzing the three-dimensional model on the display for defects, or a combination of both.

16. The method of claim 10, wherein the optical imaging and processing system further comprises a photodiode array, and wherein the optical element is configured to transmit a video stream of the turbine component interior to the photodiode array as the optical element is moved within the turbine component interior between multiple vantage points.

17. The method of claim 10, the method further comprising:
   storing instructions in the processor, wherein a controller, the processor, or both carry out the instructions.

18. The method of claim 10, the method further comprising:
   navigating the three-dimensional model to determine defects within the turbine component interior.

19. The method of claim 10, the method further comprising:
   moving the optical element within the turbine component interior.

* * * * *